United States Patent [19]
Sole et al.

[11] Patent Number: 6,150,987
[45] Date of Patent: *Nov. 21, 2000

[54] ANTENNA ASSEMBLY

[75] Inventors: Geoffrey Charles Sole; Simon John Gale, both of Herts, United Kingdom

[73] Assignee: Nortel Networks Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,989

[22] Filed: Dec. 2, 1996

[30] Foreign Application Priority Data

Dec. 8, 1995 [GB] United Kingdom ............... 9525110

[51] Int. Cl.$^7$ ........................................... H01Q 3/00
[52] U.S. Cl. .................. 343/757; 455/525; 455/553; 455/437
[58] Field of Search ................. 343/757; 455/403, 455/524, 525, 550, 553, 436, 437, 339

[56] References Cited

U.S. PATENT DOCUMENTS

| | | | |
|---|---|---|---|
| 2,401,759 | 6/1946 | Hersey | 343/765 |
| 3,696,432 | 10/1972 | Anderson et al. | 343/761 |
| 4,092,600 | 5/1978 | Zimmermann et al. | 343/180 |
| 4,349,840 | 9/1982 | Henderson | 455/289 |
| 4,542,326 | 9/1985 | Hornback | 343/7.4 |
| 5,128,925 | 7/1992 | Dornstetter et al. | 455/5.1 |
| 5,303,240 | 4/1994 | Borras et al. | 455/33.3 |
| 5,383,221 | 1/1995 | Akita et al. | 455/56.1 |
| 5,390,366 | 2/1995 | Kasugai | 455/56.1 |
| 5,418,839 | 5/1995 | Knuth | 455/341 |
| 5,442,680 | 8/1995 | Schellinger et al. | 455/33.1 |
| 5,511,235 | 4/1996 | Duong et al. | 455/75 |
| 5,537,685 | 7/1996 | Matsuno | 455/56.1 |
| 5,548,837 | 8/1996 | Hess et al. | 455/278.1 |
| 5,564,077 | 10/1996 | Obayashi et al. | 455/89 |
| 5,574,983 | 11/1996 | Douzono et al. | 455/69 |
| 5,633,647 | 5/1997 | Tines | 343/766 |

FOREIGN PATENT DOCUMENTS

0713262A2  5/1996  European Pat. Off. .
2015720  1/1990  Japan .

OTHER PUBLICATIONS

Investigation of Mobile Antenna Diagrams on Cochannel Interference. Inventors: T Benkner and K David.

Steerable L–band antennas for land mobile terminals Inventors: J Aurinsalo, I Huhtinen, A Hujanen, A Joggejans, I Marttila, R Mutanen, I Pitkanern, P Rinous, T Salminen, S Tallqvist, M–N Travers.

*Primary Examiner*—Thien M. Le
*Assistant Examiner*—Daniel St. Cyr
*Attorney, Agent, or Firm*—Lee, Mann, Smith, McWilliams, Sweeney & Ohlson

[57] ABSTRACT

An antenna assembly for a communications network is disclosed, the assembly comprising an antenna which is operable in different modes of operation; wherein, in a first mode, the antenna is operable as a scanning antenna to scan and thereby determine a communications link with a selected one of a plurality of base stations and in a second mode is operable as a communications antenna to communicate with the selected one of the plurality of base stations. Control means are provided which are operable to receive data from the antenna when operating in a scanning mode, to determine which base station should be used for future data communication and can move the orientation of the antenna such that it is operable to communicate with selected one of the base stations. A method of operation is also disclosed.

27 Claims, 5 Drawing Sheets

ANTENNA ASSEMBLY

FIELD OF THE INVENTION

This invention relates to fixed wireless access systems and to an antenna assembly suitable for use therein.

BACKGROUND OF THE INVENTION

Fixed wireless systems are currently employed for local telecommunication networks, such as fixed radio access. Known systems comprise an antenna and decoding means which are located, for instance adjacent a telephone. The antenna receives the signal and provides a further signal by wire to a decoding means. Thus subscribers are connected to a telecommunications network by a radio link in place of the more traditional method of copper cable. Such wireless local loop systems will be capable of delivering a wide range of access services from POTS, ISDN to broadband data. The radio transceivers at the subscribers premises communicate with a base station, which provides cellular coverage over, for example, a 5 km radius in urban environments. A typical base station will support 500–2000 subscribers. Each base station is connected to the standard PSTN switch via a conventional transmission link/network.

When a wireless local loop telecommunications system is originally deployed, then a base station of a particular capacity will be installed to cover a particular area. The capabilities of the base station will be commensurate with the anticipated coverage and capacity requirement. Subscribers antennas will be mounted outside, for instance on a chimney and upon installation will be directed towards the nearest base station or repeater antenna (any future reference to a base station shall be taken to include a repeater). A potential problem with this sort of alignment is that, for instance, the antenna is aligned during the winter months but by the following summer, foliage of a growing tree has obscured the line of sight. Alternatively a building may have been erected in the line of sight. As more subscribers are acquired, more base stations may be deployed in order to increase capacity, thereby requiring the realignment of some subscriber antennas. There is also becoming an increasing interest in receive-only broad band access systems such as multi-point video distribution system MVDS and problems similar to wireless local loop have been found to occur.

OBJECT OF THE INVENTION

It is an object of the invention to provide an arrangement whereby the above problems can be overcome or reduced. It is a further object of the invention to provide such an arrangement which can be easily and cheaply produced on a mass production basis.

STATEMENT OF INVENTION

According to a first aspect of the invention, there is provided an antenna assembly for telecommunications network, the assembly comprising an antenna which is operable in different modes of operation; wherein, in a first mode, the antenna is operable as a scanning antenna to scan and thereby determine a communications link with a selected one of a plurality of base stations and in a second mode is operable as a communications antenna to communicate with the selected one of the plurality of base stations.

The assembly can further comprise control means, wherein the control means are operable to receive data from the antenna when operating in a scanning mode, determine which base station should be used for future data communication and move the orientation of the antenna such that it is operable to communicate with selected one of the base stations.

The antenna can be mounted on a movable platform. Alternatively, the antenna is an adaptive antenna which is operable to effect electrical steering of the beam. Separate antennas can be provided to perform the scanning function and data communication function respectively. The antenna or antennas can be rotatably mounted upon the support whereby the antenna or antennas are rotatable. The antenna or antennas can be rotatable by means of an electric motor and the antenna is rotatable under the control of the control means.

In accordance with a further aspect of the invention, there is provided a method of operating an antenna assembly in a communications network, the method comprising the following steps:

operating a scanning antenna; determining the angular orientation required to achieve an optimal orientation of the antenna with respect to a base station antenna;

adjusting the orientation of the antenna whereby effective communications may be established with a base station.

According to a further aspect of the invention, there is provided a subscriber terminal for a communications network having a plurality of base stations, said terminal comprising an antenna, a transceiver coupled to the antenna, and an antenna controller coupled to the transceiver and the antenna, wherein the antenna is operable by the controller in a first mode to scan the broadcast signals of the base stations and thereby identify one of the plurality of base stations and is operable by the controller in a second mode as a communications antenna to provide a communications link between the subscriber and the network via said selected base station.

According to another aspect of the invention, there is provided a method of operating a communications network, said network having a plurality of base stations and a network controller, and at least one subscriber terminal, said terminal comprising an antenna, a transceiver coupled to the antenna, and an antenna controller coupled to the transceiver and the antenna, said method comprising causing the controller to control the antenna in a first mode in which the antenna scans the broadcast signals of the base stations, identifies one of the plurality of base stations, and then operating the antenna in a second mode as a communications antenna and providing a communications link between the subscriber and the network via said identified base station.

Preferably the method further comprises-the step of monitoring the signal quality of the communication link whereby an optimal link with a base station can be maintained. In order to perform this function, the scanner can be operated on a regular basis, for example, in the early hours of a morning, or immediately after the termination of a transmission during which the signal quality was poor. In which case the antenna would operate in a scan mode, in a similar fashion as if the antenna had just been installed and the effective cone of coverage of the antenna had been scanned in order to determine the most appropriate base station with which communication can be established. The signal quality of the communication link can also be monitored continuously and the orientation of the transceiver antenna can be adjusted in response, whereby an optimal link with a base station can be maintained. Other schemes are possible.

BRIEF DESCRIPTION OF THE FIGURES

In order that the present invention is more fully understood, reference shall now be made to the Figures as shown in the accompanying drawing sheets, wherein.

DETAILED DESCRIPTION OF THE PREFERRED EMBODIMENT

Figure 1:
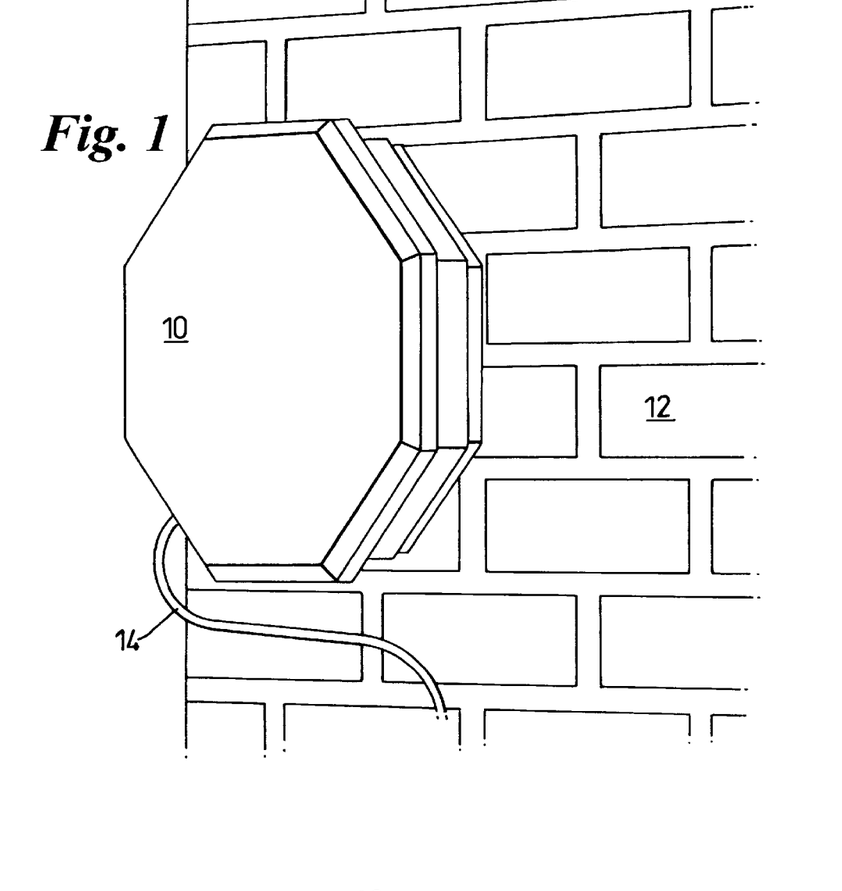
FIG. 1 is a diagrammatic perspective view of a typical installation of a wireless local loop antenna assembly according to the prior art.

The integrated antenna assembly 10 shown in FIG. 1 comprises one part of a residential service system for a wireless local loop arrangement and is mounted on a chimney breast 12 of a house—it is preferably located between fascia board level and 1–2 m above the roof top. In this case, the antenna assembly is mounted for use in a wireless local loop telecommunications environment and is connected via a cable 14 to a junction unit for connection with standard telephone and/or facsimile equipment and a power unit.

Figure 4A:
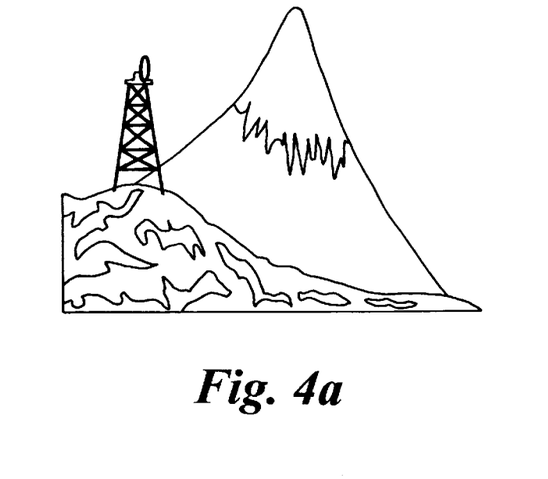
FIGS. 4a and 4b show examples of sources of fading.

Upon installation, the antenna is directed towards the nearest base station. If a building is erected such that it interferes with an optimal link with this base station, then this link may not be sufficiently strong to provide an effective link. At such times the alignment of the antenna would have to be adjusted in a similar fashion as occurred upon the original installation of the antenna whereby the antenna can achieve an optimal link. Since the antenna can communicate with any base station within range, fixed obstructions due to terrain features—see FIG. 4a and terrain clutter such as buildings, trees and the like, can be taken into account during installation.

Figure 2:
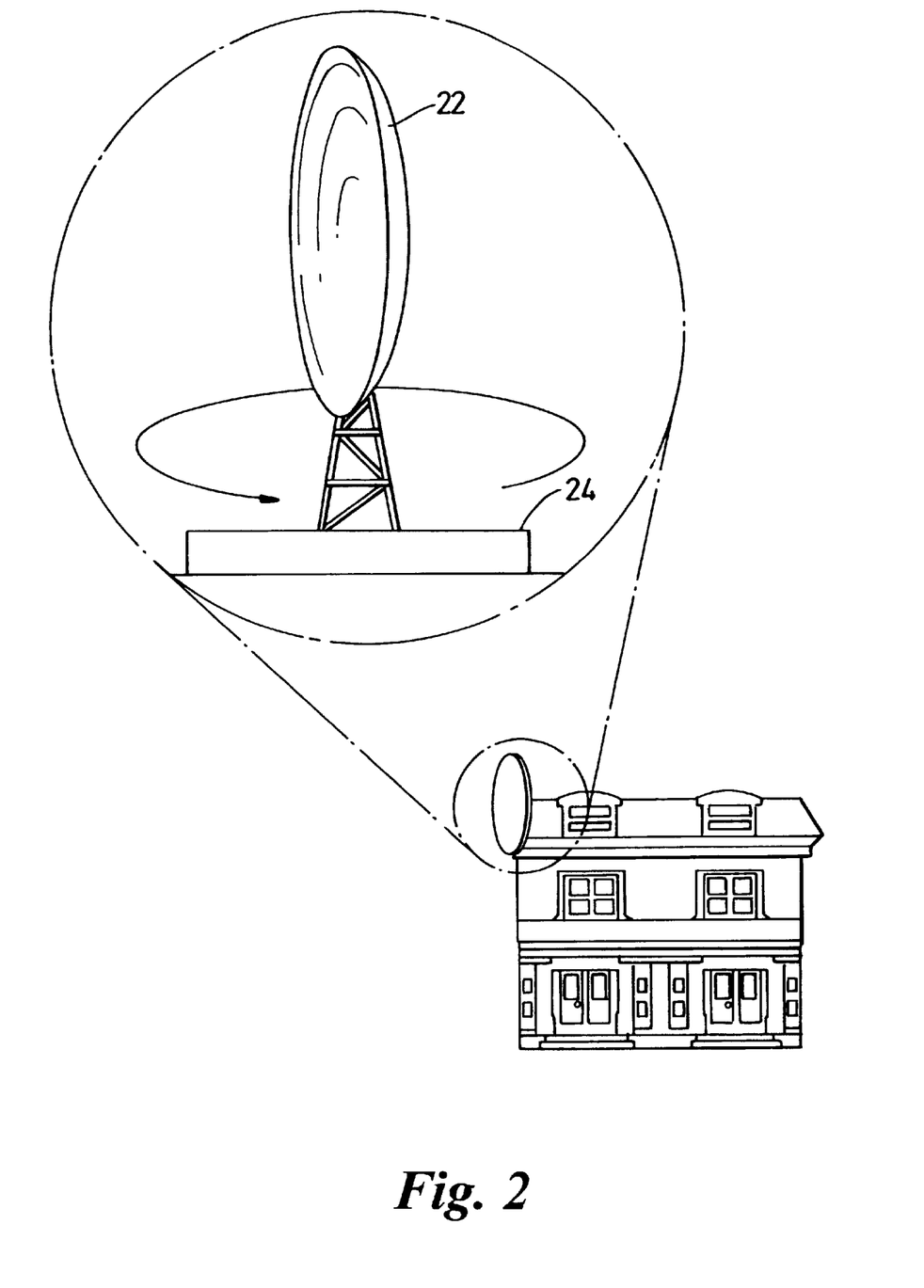
FIG. 2 shows an arrangement in accordance with the invention.

Referring now to FIG. 2, there is depicted a first embodiment of the invention, wherein the subscriber unit comprises an antenna 22 which is rotatably mounted on a support body 24 and is operable in one mode to scan whereby a base station may be identified and in a second mode to transmit communication signals to and from a base station. When operating in a scanning mode, the antenna rotates about an arc or through 360° and can identify a base station with which the antenna can establish communications. When operating as a scanning antenna, the antenna receives traffic signals which are emitted by the various base stations in the area. The antenna can scan in a simple fashion, i.e. in an arc or may scan in a raster fashion, depending upon the local terrain and disposition of base stations. Ideally the antenna merely scans in azimuth at one angle with respect to the vertical. The best received signal can accordingly be used in subsequent communications. Alternatively, the base station providing the best signal may have reached its system capacity limit and the base station providing the next best signal may be employed.

Once a base station has been selected, the antenna is directed towards that base station by means of the motorised positioning system under control of control means. It may be determined that several base stations are present in the field of arc as seen by the first antenna, and the control means will determine the strongest received signal. The signal quality of the communication link can be monitored continuously and the orientation of the transceiver antenna can be adjusted in response, whereby an effective link with a base station can be maintained. This would require that each base station has a channel available for traffic control at all times. It may be preferable that the search for the best signal is carried out on a regular basis, for example, in the early hours of a morning, or immediately after the termination of a transmission during which the signal quality was poor. In such a case the antenna would scan in a similar fashion as if the antenna had just been installed and the effective cone of coverage of the communication antenna had been scanned to determine the most appropriate base station with which communication can be established.

In the case of repeater stations, it may be appropriate that the antenna can act as a repeater with respect to more than one base station. In such a case it is an advantage that the repeater station be equipped with an antenna made in accordance with the present invention.

The method of operation of the antenna arrangement is as follows: the antenna is operated in a scan mode to determine the angular orientation of the antenna required to achieve an optimal communication with a base station by means of positioning means and maintaining the orientation of the antenna whereby effective communications may be established with the base station. This self aligning aspect of the invention has a particular advantage in relation to the installation of a wireless local loop subscriber unit, since all that needs to be carried out is that the antenna unit is securely attached to a house or other support.

An alternative embodiment would be the provision of a fixed antenna which has an electronic beam steering capability. Such beam steering is provided by the separate excitation of each antenna element in a facet. Any such implementation would require electronic control equipment to be present to effect the beam steering. One advantage is that the antenna assembly would not be required to move, dispensing with the requirement for the motorised positioning system.

Figure 3:
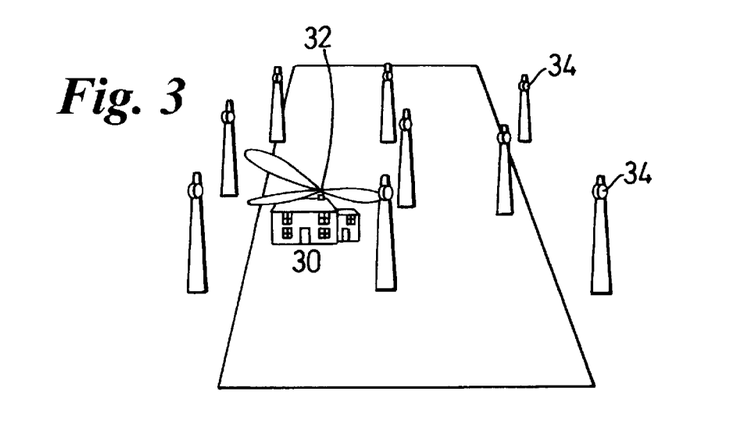
FIG. 3 shows the arrangement of FIG. 2 deployed in a cellular network.

The provision of the capability for some adaptive reconfiguration of the wireless local loop network via a self-aligning subscriber antenna which allows maximum advantage to be taken of base station selection. FIG. 3 shows a simplified representation of a base station selection fixed radio access network: a subscribers premises 30 has an antenna installation 32 which enables the subscriber unit the choice of communicating with any one of a number of adjacent base stations 34.

Figure 3A:
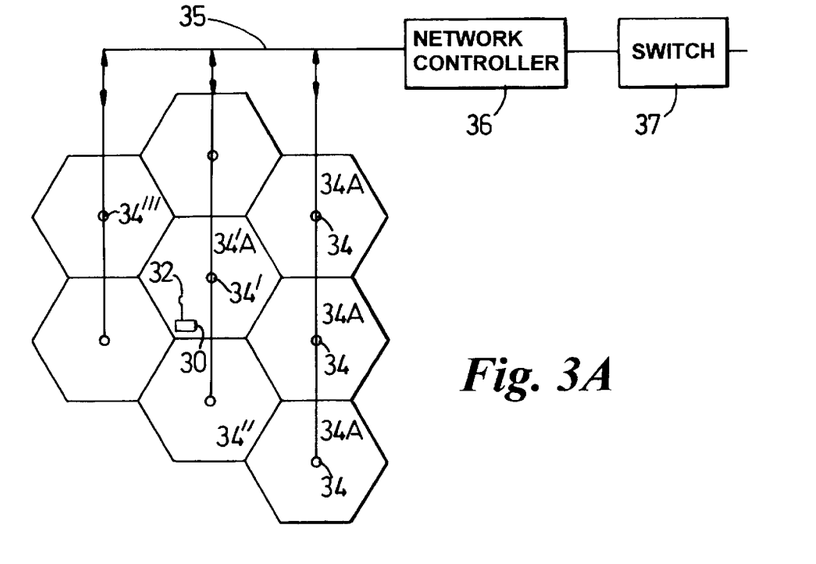

FIG. 3A shows a plan view of the cellular system of FIG. 3 and the base stations such as 34 at the approximate centres of their cells 34A which they, respectively, serve. The subscriber 30 with his aerial 32 is located in cell 34' A served by base station 34' and would normally communicate with that base station. It could communicate with base station 34" or 34'" as shown by the respective beams. Each base station is connected by ground lines 35 to a network controller 36 which links with a public network switch 37.

Figure 5:
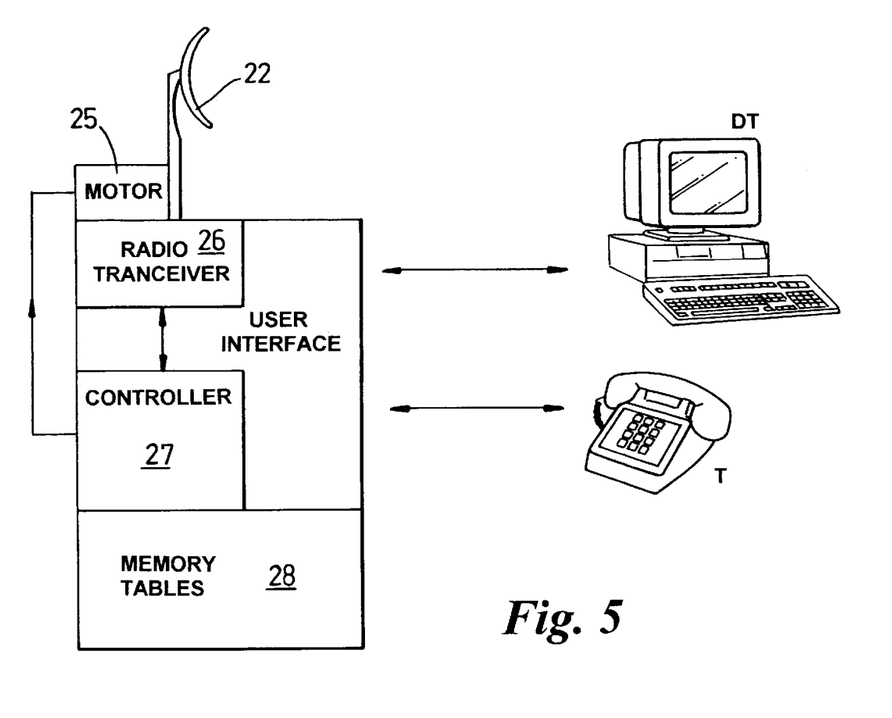
FIG. 5 shows a block schematic of the basic functional parts of the arrangement of FIG. 2.

Referring to FIG. 5, the subscriber's terminal is shown in greater detail. It comprises the rotatable antenna 22 having a motor 25 to rotate it. The antenna is coupled to a radio transceiver unit 26 which both transmits via the antenna 22 and receives via the antenna 22. The radio transceiver 26 is coupled to a controller 27 which is also linked 27A to the motor 25. The controller 27 is linked to memory tables 28. A user interface 29 couples the radio transceiver and the controller to the user terminals such as telephone T or data terminal DT.

Figure 6:
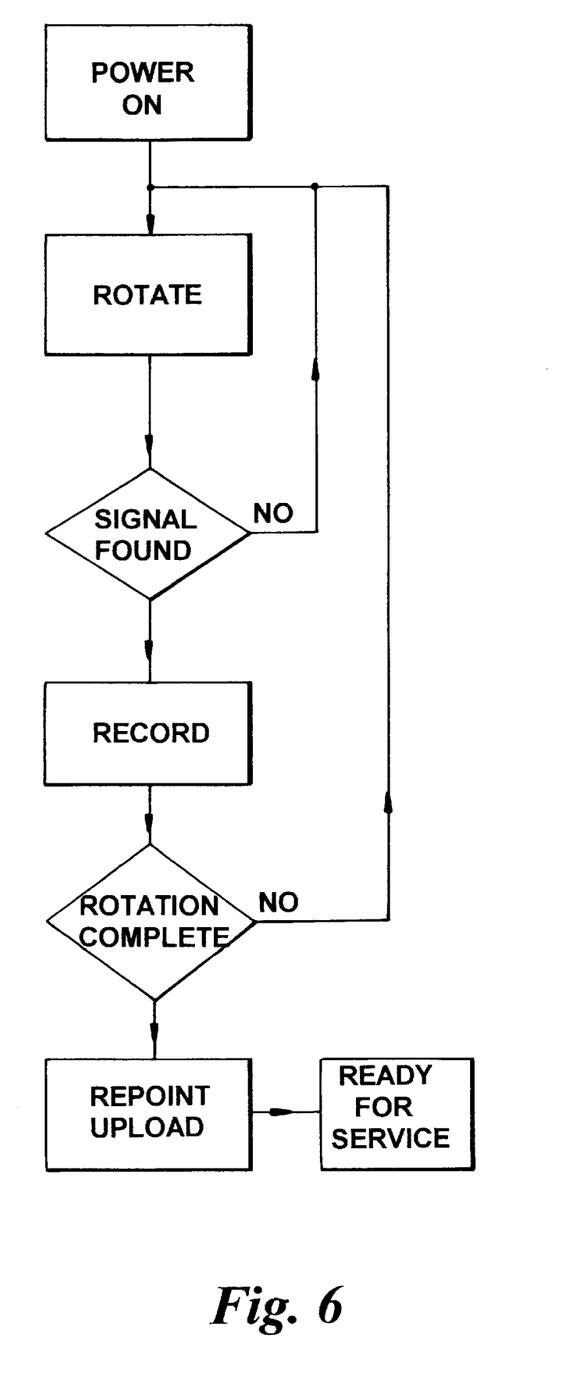
FIG. 6 shows a flow diagram of the operation of FIG. 2.

Referring to FIG. 6, there is shown a flow chart which describes the installation procedure. When the subscriber's equipment is installed and the power is switched on (power on) the controller 27 powers the motor 25 via link 27A to rotate the antenna 22 to search for a broadcast transmission. The subscriber antenna autonomously rotates at power on and searches for the broadcast channels transmitted for all the base stations 34 in the cellular RF network. On reception of such a broadcast signal, it will cease rotation (signal found) and optimise the direction in which the antenna points for that specific signal. Signal levels and signal to interference ratios will then be measured and recorded (record signal) in the memory table 28 together with the azimuth and transmitted identity of that particular base station 34.

The controller 27 will then continue to power the motor 25 to rotate antenna 22 to resume its search and add all such receive signals in a similar manner to the memory table 28.

When all azimuths have been searched, the subscriber unit will select (repoint) one of the base stations using a criterion based on the measured signal and the signal-to-interference levels and repoint to the optimum azimuth and establish a connection with that base station. When this connection is established the subscriber unit will then register with the network (network controller 36) and upload the contents of its memory table thereby permitting a network controlling function to have the ability to command the subscriber to repoint to a second base station 34 at some future time. Repointing could be necessary, for example, if the capacity load of the first base station is exceeded, or if it requires maintenance or upgrading, or if as previously discussed, the link with the existing base station becomes unsatisfactory.

Thereafter the subscriber antenna 22 will remain pointing at the preferred base station for all incoming and outgoing calls unless it is commanded by the network controller to repoint or unless the subscriber ceases to receive an adequate broadcast signal from that base station.

The above operation effectively describes the initial installation process. During use of the system, and during periods of low traffic e.g. during night time hours, the network controlling function will make connection with the subscriber unit and request it to update the memory table 28 described above and upload it as before. This will enable slow changes in the propagation environment caused by factors such as seasonal variations, tree growth of the erectional demolition or man-made structures to be taken into account in any associated repainting undertaken.

During normal day to day operations, the subscriber unit will monitor the broadcast signal from its selected base station at regular intervals. This is done by controller 27. If the signal level falls significantly then the controller will automatically repoint the antenna 22 to the second preference base station as determined by the contents of memory table 28 and inform the network (network controller 36). If this fails, then the subscriber unit will continue to examine other options from the memory table 28 until a usable signal is obtained. The subscriber unit will then establish connection with network controller 36 and inform it of the current status of the memory table.

Figure 7:
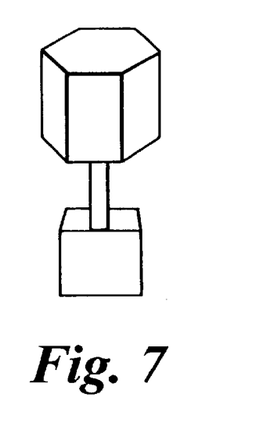
FIG. 7 shows schematically an alternative to FIG. 2.

Referring to FIG. 7, there is shown schematically a six-sided facet antenna each facet of which can be beam-steered over 60° so that the whole antenna assembly can cover 360°. This could be used in place of the rotatable antenna 22 and the controller 27 of FIG. 5 instead of controlling a motor 25 would instead control a beam steering controller which would electronically steer the beams of the six-sided antenna. In all other respects the flow diagram and the previous description will apply to the electronically beam-steered antenna as it would apply to the physically rotatable antenna.

The use of higher frequencies, for example above 10 GHz, is being considered in certain countries, although regard must also be taken with respect to local regulations. Local regulations may, for instance, demand that antennas are not more than a certain size and may restrict the position of the antenna assembly upon a building.

The performance of present and other presently envisaged wireless local loop or fixed radio access systems will be compromised at high microwave and millimetric frequencies due to the effects of slow temporal fading. At such high frequencies, diffraction into shadowed regions becomes less significant and therefore very high transmit powers are required, to penetrate shadowed regions. As such, the use of high frequencies is untenable. In contrast, the present invention allows a subscriber to use flexibly any one of a number of base stations which is within range.

Figure 4B:
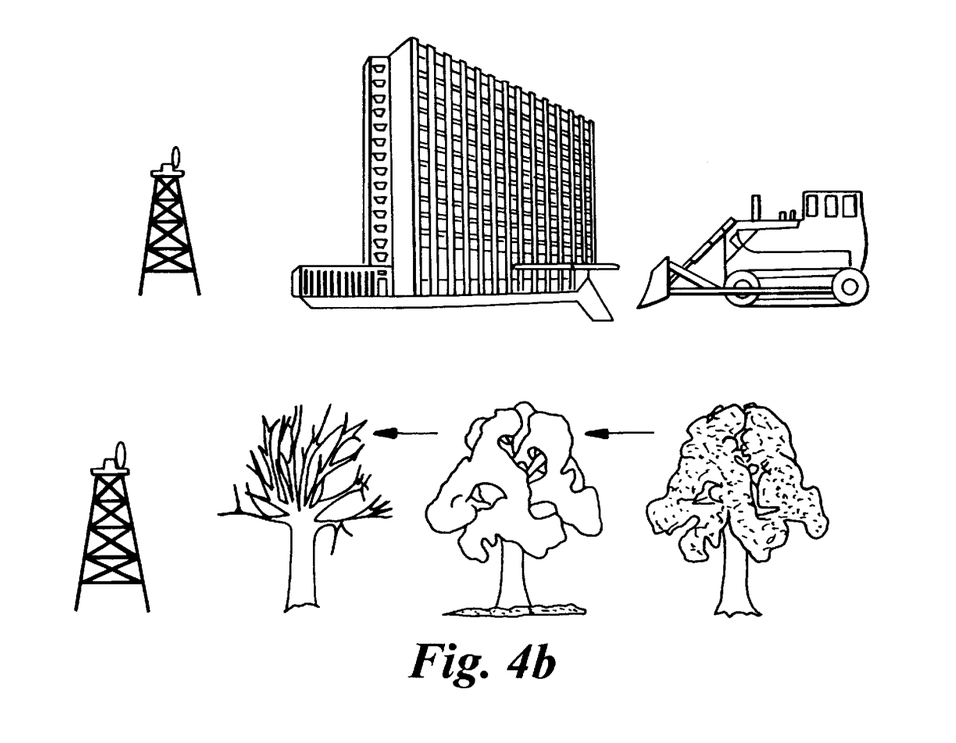

Temporally varying slow fades due to building construction, trees growing and gaining leaves can, however, cause problems. FIG. 4b shows examples of such sources of fading. Further problems would also arise due to increases in the numbers of subscribers and the effects of cell splitting, as a result of the provision of further base stations. Present systems would require that an installation man would need to be deployed to realign subscribers antennas as new base stations are deployed or as temporal fades occur. If the subscribers antenna is remotely aligned or self-aligned, via the network control, then network build/maintenance costs are considerably reduced.

The provision of self-aligning directive antennas would be a significant factor in any large scale implementation of a wireless local loop scheme: base station selection, by which is meant that, by the use of a sufficient number of base stations, communication with a base station could readily be improved from an average of 70% to 95%. In addition, a frequency re-use of 3 or more is usually required whilst an implementation of the present invention would allow a frequency re-use of 1 to be used. The use of such a number of base stations would allow lower transmit powers to be deployed, giving the potential for any power amplifier to support more channels without the introduction of significant non-linearities.

What is claimed is:

1. In a fixed wireless communication system using multiple access techniques, comprising a plurality of base stations connected to a known transmission network and a plurality of subscriber stations, the base stations and subscriber stations transmitting signals solely by wireless means, a subscriber antenna assembly, the antenna assembly comprising a directional antenna which is operable in different modes of operation; wherein, in a first mode, the antenna is operable as a scanning antenna to scan in azimuth and thereby determine a communication link with a selected one of a plurality of base stations and in a second mode is operable as a communication antenna to communicate with the selected one of the plurality of base stations.

2. The subscriber antenna assembly according to claim 1, wherein the antenna is mounted on a movable platform.

3. The subscriber antenna assembly according to claim 1, wherein the antenna is an adaptive antenna which is operable to effect electrical steering of the beam.

4. The subscriber antenna assembly according to claim 1, wherein separate antennas are provided to perform the scanning function and data communication function separately.

5. The subscriber antenna assembly according to 1, wherein the antenna or antennas are mounted on the support whereby the antenna or antennas are pivotable.

6. The subscriber antenna assembly according to claim 1, wherein the antenna or antennas are mounted on a support whereby the antenna or antennas are pivotable, wherein the antenna or antennas are rotatable by means of an electric motor and the antenna is movable upon the rotatable support under the control of a control means.

7. The subscriber antenna assembly according to claim 1, wherein the assembly comprises part of a wireless local loop arrangement.

8. The subscriber antenna assembly according to claim 1, wherein the assembly comprises part of a broad band multi media telecommunications system.

9. In a fixed wireless communication system using multiple access techniques, comprising a plurality of base stations connected to a known transmission network and a plurality of subscriber stations, the base stations and subscriber stations transmitting signals solely by wireless means, a subscriber antenna assembly comprising a directional antenna which is operable in different modes of operation; wherein, in a first mode, the antenna is operable as a scanning antenna to scan in azimuth and thereby determine a communication link with a selected one of a plurality of base stations and in a second mode is operable as a communication antenna to communicate with the selected one of the plurality of base stations, wherein the assembly further comprises control means, wherein the control means are operable to receive data from the antenna when operating in a scanning mode, determine which base station should be used for future data communication and move the orientation of the antenna such that the antenna is operable to communicate with selected one of the base stations.

10. The subscriber antenna assembly according to claim 9, wherein the antenna is mounted on a movable platform.

11. The subscriber antenna assembly according to claim 9, wherein the antenna is an adaptive antenna which is operable to effect electrical steering of the beam.

12. The subscriber antenna assembly according to claim 9, wherein separate antennas are provided to perform the scanning function and data communication function separately.

13. The subscriber antenna assembly according to 9, wherein the antenna or antennas are mounted on the support whereby the antenna or antennas are pivotable.

14. The subscriber antenna assembly according to claim 9, wherein the antenna or antennas are mounted on the support whereby the antenna or antennas are pivotable, wherein the antenna or antennas are rotatable by means of an electric motor and the antenna is movable upon the rotatable support under the control of the control means.

15. The subscriber antenna assembly according to claim 9, wherein the assembly comprises part of a wireless local loop arrangement.

16. The subscriber antenna assembly according to claim 9, wherein the assembly comprises part of a broad band multi media telecommunications system.

17. A method of operating a subscriber antenna assembly in a wireless local loop system, using multiple access techniques, comprising a plurality of base stations connected to a known transmission network and a plurality of subscriber stations, the base stations and subscriber stations transmitting signals solely by wireless means, a subscriber antenna assembly, the antenna assembly comprising a directional antenna which is operable in different modes of operation; wherein, in a first mode, the antenna is operable as a scanning antenna to scan in azimuth and thereby determine a communication link with a selected one of a plurality of base stations and in a second mode is operable as a communication antenna to communicate with the selected one of the plurality of base stations, the method comprising the following steps:

operating an antenna in the scanning mode in azimuth;

determining the angular orientation required to achieve an optimal orientation of the antenna with respect to a base station antenna;

adjusting the orientation of the antenna whereby effective communication is established with a base station.

18. The method of operating a subscriber antenna arrangement as claimed in claim 17, further comprising the step of monitoring the signal quality of the communication link whereby an optimal link with a base station can be maintained.

19. The method according to claim 17, further comprising the step of monitoring the signal quality of the communication link whereby an optimal link with a base station can be maintained, wherein the antenna operates in a scan mode on a regular basis.

20. The method according to claim 17 further comprising the step of monitoring the signal quality of the communication link whereby an optimal link with a base station can be maintained, wherein the base station transmits a pilot signal to facilitate the maintenance of signal quality.

21. The method according to claim 17, wherein the antenna operates in a scan mode immediately after the termination of a transmission during which the signal quality was poor.

22. In a fixed wireless communication system using multiple access techniques, comprising a plurality of base stations connected to a known transmission network and a plurality of subscriber stations, the base stations and subscriber stations transmitting signals solely by wireless means, a subscriber terminal, said terminal comprising a directional antenna, a transceiver coupled to the antenna, and an antenna controller coupled to the transceiver and the antenna, wherein the antenna is operable by the controller in a first mode to scan in azimuth the broadcast signals of the base stations and thereby identify one of the plurality of base stations and is operable by the controller in a second mode as a communication antenna to provide a communication link between the subscriber and the network via said selected base station.

23. The terminal as claimed in claim 22, wherein, in the first mode, the terminal identifies each of the plurality of base stations, and in the second mode the communication link is provided between the subscriber and the network via a base station identified as one providing the strongest received signal.

24. A method of operating a fixed wireless communication system using multiple access techniques, comprising a plurality of base stations connected to a known transmission network and a plurality of subscriber stations, the base stations and subscriber stations transmitting signals solely by wireless means, said subscriber terminals comprising an antenna, a transceiver coupled to the antenna, and an antenna controller coupled to the transceiver and the antenna, said method comprising the following steps: in a first mode causing the controller to control the antenna whereby the antenna scans in azimuth the broadcast signals of the base stations, and identifies one of the plurality of base stations, and then, operating the antenna in a second mode as a communication antenna, providing a communication link between the subscriber and the network via said identified base station.

25. The method as claimed in claim 24, including repeating the first mode of operation at intervals to check the quality of the link and, if necessary, provide a communication link between the subscriber and the network via a different one of said plurality of base stations.

26. The method as claimed in claim 24 including the step of downloading to the network controller the identity of one or more of the base stations identified by the subscriber terminal.

27. The method as claimed in claim 25 including the step of downloading to the network controller the identity of one or more of the base stations identified by the subscriber terminal.

* * * * *